(12) United States Patent
Hua et al.

(10) Patent No.: US 6,214,431 B1
(45) Date of Patent: Apr. 10, 2001

(54) OPTICAL DATA STORAGE MATERIALS FOR BLUE-LIGHT DVD-R

(76) Inventors: Zhongyi Hua; Guorong Chen, both of 220 Handen Rd., Shanghai 200433 (CN)

( * ) Notice: Subject to any disclaimer, the term of this patent is extended or adjusted under 35 U.S.C. 154(b) by 0 days.

(21) Appl. No.: 09/308,465

(22) PCT Filed: May 4, 1998

(86) PCT No.: PCT/CN98/00070

§ 371 Date: May 19, 1999

§ 102(e) Date: May 19, 1999

(87) PCT Pub. No.: WO99/17284

PCT Pub. Date: Apr. 8, 1999

(30) Foreign Application Priority Data

Sep. 26, 1997 (CN) .................................................. 97106630

(51) Int. Cl.$^7$ ....................................................... B32B 3/02
(52) U.S. Cl. .................... 428/64.1; 428/64.2; 428/64.4; 428/64.8; 428/913; 430/270.14; 430/270.16; 430/495.1; 430/945; 369/283; 369/288
(58) Field of Search ................................. 428/64.1, 64.2, 428/64.4, 64.8, 913; 430/270.14, 270.16, 270.2, 495.1, 945; 369/283, 288

(56) References Cited

U.S. PATENT DOCUMENTS 4,574,366  3/1986  Potember et al. .
4,731,756  3/1988  Potember et al. .

OTHER PUBLICATIONS

Takao Suzuki, "Magneto–optic Recording Materials", MRS Bulletin, vol. 1, No. 9 Sep., 1996, pp. 42–47.
Maeda et al., "Rewritable Digital Video Disc System Using Magneto–optical Disc", IEEE Trans. Consum. Electron., vol. 41, No. 3, pp. 510–514, 1995.
Noboru Yamada, "Erasable Phase—Change Optical Materials", MRS Bulletin, vol. 21, No. 9, pp. 48–50, Sep. 1996.
Hua et al., "A new material for optical, electrical and electronic thin film memories", Vacuum, vol. 43, No. 11, pp. 1019–1023, 1992.
Potember et al., "Molecular Electronics", Johns Hopkins APL Technical Digest, vol. 7, No. 2, pp. 129–141, 1986.

Primary Examiner—Elizabeth Evans
(74) Attorney, Agent, or Firm—Merchant & Gould P.C.

(57) ABSTRACT

The present invention provides a new category of information storage material, nonstoichiometric metal-organic complex $Ag_{1-\beta}(TCNQ)$, which is particularly suitable for digital video disc (DVD-R) operated by blue laser (wavelength 450 nm) or red laser (wavelength 650 nm), wherein, Ag is silver, TCNQ is tetracyano-p-quinodimethane $C_{12}H_4N_4$, $\beta$ is a parameter chosen by its performance and $\beta \leq 0.4$. The material can produce apparent absorption change under the incidence of the above-mentioned two different lasers. When used as optical recording medium, it has the advantages of high signal-to-noise ratio, fast response and low cost. The actual number of write-erase cycles can be larger than 20. Therefore, its performance is better than a conventional DVD-R.

8 Claims, 1 Drawing Sheet

OPTICAL DATA STORAGE MATERIALS FOR BLUE-LIGHT DVD-R

TECHNICAL FIELD

This invention relates to a category of photochromatic materials suitable for blue-light and red-light rewritable digital video discs (DVD) for information storage, and the discs using these materials.

DESCRIPTION OF THE PRIOR ART

The digital video disc (or digital versatile disc, DVD) debuted at November, 1996, has caught the global attention, and hence been honored as "The Memory of 21st Century." This is because, as comparing to all different kinds of optical discs, DVD has much greater storage density with complete digitalization. It breaks a new era for TV, audio, communication, computer and data storage. Following the currently negotiated international standard, DVD should use substrates with the same size of a compact disc (CD), i.e. 120 mm in diameter. DVD can be recorded on both sides, having a storage capacity of 4.7 Gb per side, which is 7 times greater than that of a CD with the same storage area (the capacity of which is 650 Mb). Because of the high capacity, the video playing time can be 133 min, which can hold a full-length movie. Besides, the expected value of resolution of DVD is 800 lines which is much better than the conventional TV. The Dolby Surround AC-3 can be used for sound system, and a recorded movie may have 8 different dialogue languages and up to 32 different captions, if necessary.

It is recognized internationally that, increasing the storage density (storage capacity per unit area) is still the direction for further development of DVD. It is known that the storage density of an optical disc is intimately related to the spot size of the laser beam used. Because the diameter of the laser spot is directly proportional to the wavelength of the light, therefore, to decrease the spot size, shorter wavelength should be used. Formerly, CD and video compact discs (VCD) use an infra-red laser beam with wavelength of 780 nm, and recently, DVD would use a red beam with wavelength 650 $\mu$m comes from a semiconductor laser, the spot diameter of which is about 1 mm. If DVD can use blue light with a wavelength of 450 nm, then the storage capacity of a single side can be increased from 4.7 Gb to about 10 Gb. For a motion picture, a double-sided blue-light DVD can record 2 full-length movies with a resolution corresponding to a high-definition television (HDTV), and obviously this cannot be done by a red-light DVD. Therefore, to increase the storage density of a DVD, the most possible and acceptable way is using a solid laser that emits blue-light, and hence the "blue-light DVD" is termed as "DVD of the next generation".

A conventional DVD disc is a read-only memory (ROM). Just like the earliest CD, the information storage is realized by forming mechanical cavities on the disc surface. Therefore, no problem will be raised for the storage media. For a write-once memory, or DVD-R, many people entrust their hope for the magneto-optical (MO) or phase-transition (PT) materials as originally prepared for writable CD. MO material is an alloy formed of a rare-earth and a transition metal. This alloy has an axis of magnetization perpendicular to the surface of storage film. Using a laser to demagnetize and an external magnetic field to determine the directions of magnetization, positive or negative, "0" and "1" can be distinguished. The PT material is usually a multi-element amorphous semiconductor, e.g. $In_3SbTe_2$, which can have structural transformation between non-crystalline and crystalline states under the effect of laser pulses with different energies. More specially, using a laser beam to illuminate the surface of this film and changing the beam power and pulse width, the effective spot can change its structure from non-crystalline state to crystalline, or vice versa. There are significant differences between the reflectivity of these two states, therefore, they can be used as "0" and "1" to write-in or read-out the information. These two materials have entered the market gradually, however, they have some drawbacks. For instance, the MO materials require an "erase procedure" before "write-in", i.e. they cannot be used for "direct overwriting". Hence the "write-in" time should be longer, and most likely to be discarded in the near future. PT materials require a relatively complicated technology, and higher cost. The third category is the so-called photochromatic material (PK), the spectral characteristic curve of which will be changed after a certain amount of laser irradiation. It provides good contrast from transmissivity before and after the activation of light. The working principle is rather simple, its driver has less parts, and the cost of material is relatively low. Especially it is hopefully that the "photon hole-burning" method can be used for further increment of the capacity which, in principle, neither MO nor PT can have the same advantage. However, since there are some difficulties, PK materials in the past have only been investigated by few institutions and have not been commercialized.

SUMMARY OF THE INVENTION

The purpose of the present invention is to provide an optical information storage material which is suitable for blue-light DVD-R as well as red-light DVD-R.

Another purpose of this invention is to provide a kind of compact disc which employs the material mentioned above.

To realize these purposes, this invention provides a category of photochromatic material, the nonstoichiometric metal-organic complex $Ag_{1-\beta}(TCNQ)$, to meet the requirements of optical information storage for both blue-light and red-light DVD-R, wherein, Ag is silver; TCNQ is tetracyano-p-quinodimethane $C_{12}H_4N_4$, $\beta$ is an optional parameter chosen by different specifications. Generally, $\beta<0.4$, and $0.1<\beta<0.2$ is preferred.

The basic structure of optical disc made of the above-mentioned material includes a substrate, a thin film of the storage material on the substrate, and a thin gold film on the top of the film.

Metal-organic complex $Ag_{1-\beta}(TCNQ)$ has stable characteristics. They can present charge transfer during the incidence of photons and thus lead to change optical performances. Furthermore, this material has its excellent behavior at the color axis of blue light, i.e. wavelength =450 nm. Specifically, the transmissivity of the material varies greatly before and after the "write-in" process of the blue-light laser. Therefore, good signal-to-noise ratio will be available for this kind of discs.

Inspected by Raman spectra, the change in color (spectrum) induced by light is proved to be derived from the change of molecular states. Theoretically, the process of the transition is very fast. Preliminary tests show that the transition time is about 20~30 ns. Therefore, the speed for writing is very quick under enough power of light. This is also a necessary condition for such a large-scale memory as DVD-R.

Since the solid laser that emits blue light is still in the phase of research, no corporation in the market have declared that they can fabricate the blue-light DVD-R. Yet for an industrial institution, the best way for the future development is to be compatible with the current products, in other words, it is mostly preferred if a design has downward compatibility. It is known that the threshold power of writing of a metal-organic complex is almost independent on the wavelength of incidence light. In other words, if the requirement of spot size is satisfied, in principle, any kind of laser can be used. Fortunately our thin film material has another region of large contrast just at the wavelength 650 nm (red). Therefore, our material can be used for red-light DVD-R, with a laser device similar to that used in a conventional DVD driver, and when the blue-light laser is commercially available, blue-light DVD-R can be manufactured immediately using the same material.

It is also worthwhile to notice that, actually the DVD-R made from this material is not write "once" but more. Experiments show that its number of "write-erase" cycles can be more than 20. Therefore, in the future, this kind of DVD-R will probably replace some VHS video tapes, or be used in digital cameras, etc., and bring a new perspective for the development of many other important electronic appliances.

THE PREFERRED EMBODIMENTS OF THE INVENTION

Figure 1:
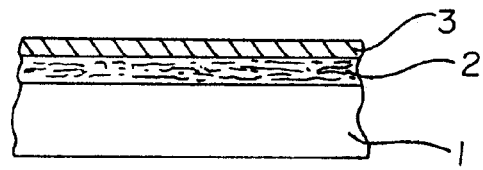
FIG. 1 shows a schematic diagram of the cross sectional view of a DVD-R according to a preferred embodiment of the invention.

In a preferred embodiment of the invention, parameter $\beta$ is chosen as 0.1. First of all, metallic silver and TCNQ were pre-fined in vacuum respectively, and then $Ag_{0.9}(TCNQ)$ thin film with thickness of 60 nm was deposited on a substrate by physical vapor deposition (PVD). Finally, a thin gold film was deposited on the top of the film by sputtering for protection. As shown in FIG. 1, the reference number 1 stands for the substrate, 2 for $Ag_{1-\beta}(TCNQ)$, and 3 for protective gold film.

Figure 2:
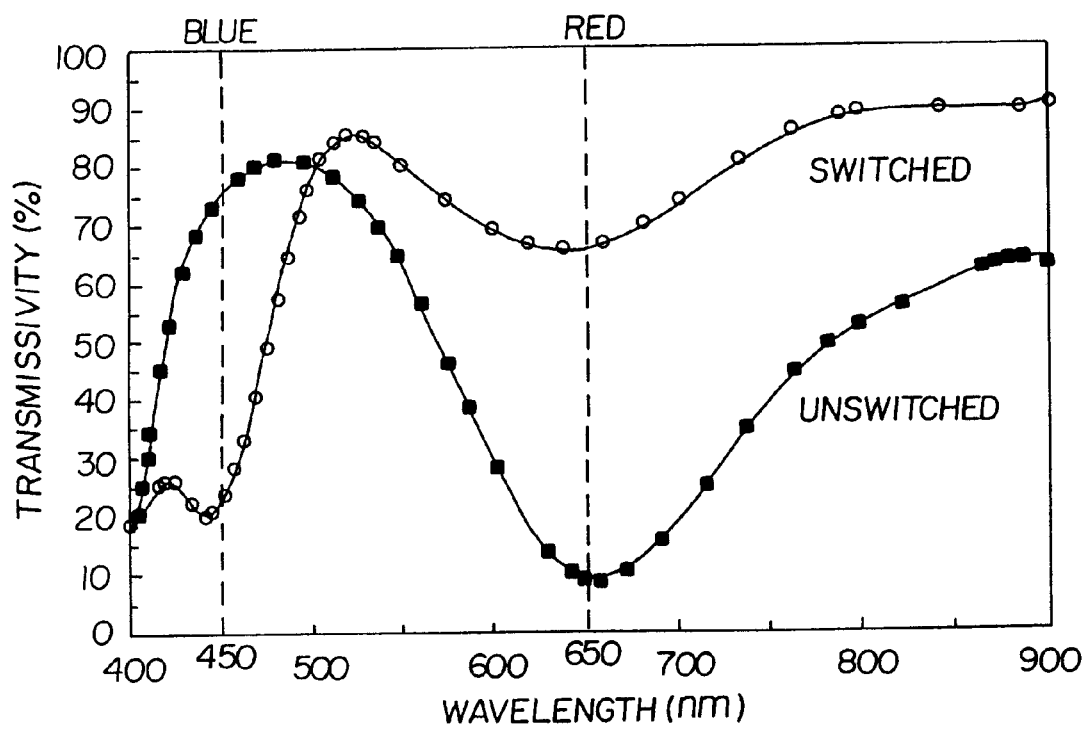
FIG. 2 shows the spectral characteristic curves of a film before and after "write-in" according to a preferred embodiment of the invention.

FIG. 2 exhibits the characteristic curves of $Ag_{0.9}(TCNQ)$ in the preferred embodiment. Curve a gives the initial spectral curve before the film has been illuminated by a laser (before "write-in"), and curve b gives the curve after the laser reaction (after "write-in"). It's obvious that at the wavelength of 450 nm, the transmissivity before "write-in" is larger than that of after "write-in". The ratio of these two transmissivities is 3.5:1. Then at the wavelength of 650 nm, the transmissivity before "write-in" is smaller than that of after "write-in", and the ratio reaches 1:7. The time for writing is about 20~30 ns. The number of write-erase cycles is more than 20.

Experiments give a further result that the threshold power of writing of the complex only slightly varies, no matter whether infrared laser, He—Ne laser or solid laser is employed. It implies that the threshold of writing power almost independs on the wavelength of the laser used. Hence, in principle, any kinds of solid or gas laser can be used as the writing source.

In another example of the invention, all the conditions are same as the previous example except $\beta=0.2$. Accordingly, the transmissivity ratio before and after "write-in" of $Ag_{0.8}(TCNQ)$ film decreases slightly, the speed of writing is 10% lower, but the number of write-erase cycles increases.

In another example, $\beta$ was chosen as 0.4, then the chemical formula of the complex is $Ag_{0.6}(TCNQ)$. The same operation is done to make an optical disc with same thickness of the storage film and the same protecting film. Now, at the wavelength of 450 nm, the ratio of the transmissivity before and after "write-in" decreased to 2:1, but the number of write-erase cycles increases significantly.

As shown in the above-mentioned experimental results, the metalorganic complex $Ag_{1-\beta}(TCNQ)$ of the present invention is suitable to fabricate DVD-R, especially for the blue-light DVD-R. Furthermore, generally $\beta \leq 0.4$ and the most preferred values are between 0.1 and 0.2.

Although some preferred embodiments were described herein, yet they are only described for illustrations but not restriction. It should be understood that it would be apparent for those skilled in the art to make changes or modifications to this invention without departing from the scope of the invention. The scope of the invention, including all these changes and modifications, is defined by the attached claims.

What is claimed is:

1. A category of optical information storage material for rewritable digital video disc (DVD-R), wherein said optical information storage materials are nonstoichiometric metal-organic complex $Ag_{1-\beta}(TCNQ)$ composed by metallic silver (Ag) and tetracyano-p-quinodimethane (TCNQ), where TCNQ is tetracyano-p-quinodimethane $C_{12}H_4N_4$, $\beta$ is an optional parameter chosen by required specifications and is between 0.1 and 0.2 and equal to or less than 0.4.

2. An optical disc comprising a substrate and a layer of gold film, wherein said disc contains a thin storage film manufactured by the material of claim 1, said storage film being deposited on said substrate, and said gold film deposited on said storage film.

3. The optical disc of claim 2, wherein said thin film is manufactured by $Ag_{0.9}(TCNQ)$, and when it is illuminated by a blue light with wavelength 450 nm, the ratio of transmissivity before and after illumination is about 3.5:1; when it is illuminated by a red light with wavelength 650 nm the ratio is 1:7.

4. The optical disc of claim 3, wherein said optical disc can be directly over-writing and the number of write-eraser cycle is greater than 20.

5. The optical disc of claim 3, wherein said disc is further suitable for operation by a laser emitting red light with a wavelength of 650 nmn.

6. The optical disc of claim 2, wherein said disc is suitable for operation by a laser emitting blue light with a wavelength of 450 nm.

7. The optical disc of claim 6, wherein said disc is further suitable for operation by a laser emitting red light with a wavelength of 650 nm.

8. The optical disc of claim 2, wherein said disc is further suitable for operation by a laser emitting red light with a wavelength of 650 nm.

* * * * *